United States Patent Office 3,258,468
Patented June 28, 1966

3,258,468
3,6-DIAZIDOCARBAZOLE AND METHOD FOR MAKING SAME
Henry M. Grotta, Delaware, Ohio, and Myron N. Lugasch, deceased, late of Columbus, Ohio, by Phyllis T. Lugasch, heir, Scranton, Pa., assignors, by mesne assignments, to Martin-Marietta Corporation, New York, N.Y., a corporation of Maryland
No Drawing. Filed Sept. 11, 1963, Ser. No. 308,304
The portion of the term of the patent subsequent to Apr. 27, 1982, has been disclaimed
2 Claims. (Cl. 260—315)

The present invention relates to 3,6-diazidocarbazole and to the method for making same.

3,6-diazidocarbazole liberates large quantities of nitrogen gas on being heated, and is therefore useful as a blowing agent for polymers.

Generally speaking, the method of the present invention comprises the steps of reducing 3,6-dinitrocarbazole to form 3,6-diaminocarbazole, tetrazotizing the 3,6-diaminocarbazole to form 3,6-carbazoletetrazonium chloride, reacting the 3,6-carbazoletetrazonium chloride with sodium azide to form 3,6-diazidocarbazole, and recovering the 3,6-diazidocarbazole thus formed.

The following is an illustrative example of the method of the present invention.

3,6-dinitrocarbazole is prepared as follows. A slurry is prepared by adding 167.2 gms. of carbazole to 1280 gms. glacial acetic acid. The slurry is stirred and maintained at 30°–40° C. for 1.5 hours, during which time 70.6 gms. sodium nitrite is added. The slurry is heated and stirred for an additional half hour, following which 10 more gms. of sodium nitrite is added. The result is 9-nitrosocarbazole, mostly in solution, to which is added a solution containing 148 gms. of 90% nitric acid and 148 gms. glacial acetic acid during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for two hours, cooled to 65° C., filtered, the filtrate discarded, the resulting solid washed with 700 ml. of cold glacial acetic acid, washed with water and dried. 172 gms. of a crude mixture of 1,6-dinitrocarbazole and 3,6-dinitrocarbazole results. To 91 gms. of the crude dinitrocarbazoles is added 6 liters of a 60 gms. per liter solution of potassium hydroxide in absolute ethanol, at 50° C. Two portions result, e.g., potassium salt of 1,6-dinitrocarbazole as insoluble residue, and a solution of the potassium salt of 3,6-dinitrocarbazole. The portions are separated by filtration, and to the filtrate is added 600 ml. concentrated hydrochloric acid, causing precipitataion of 3,6-dinitrocarbazole with coprecipitated KCl. The precipitate is washed thoroughly with warm water to remove the KCl and any other water soluble salts, and the 3,6-dinitrocarbazole is collected by filtration and dried. The 3,6-dinitrocarbazole is dissolved in hot nitrobenzene, filtered while hot, the resulting filtrate cooled to recrystallize the 3,6-dinitrocarbazole. The 3,6-dinitrocarbazole is collected by filtration, and warmed under vacuum to dry it. About 53 gms. of 3,6-dinitrocarbazole solids is recovered.

3,6-dinitrocarbazole may be reduced to form 3,6-diaminocarbazole as follows. 53 gms. of 3,6-dinitrocarbazole in 265 ml. of ethanol containing 5.3 gms. (weight wet with ethanol) of Raney nickel catalyst is reduced under 1,000 p.s.i.g. hydrogen pressure at 95°–105° C. for six hours in a stirred autoclave. The catalyst is recovered by filtration, and the filtrate diluted with water to precipitate the 3,6-diaminocarbazole therefrom. The solid 3,6-diaminocarbazole is recovered by filtration. The 3,6-diaminocarbazole is further purified by recrystallizing it twice from boiling aniline containing boneblack, as follows. The solid 3,6-diaminocarbazole is dissolved in boiling aniline containing boneblack and the solution is filtered hot to separate the boneblack and aniline solution of 3,6-diaminocarbazole. The 3,6-diaminocarbazole solution is allowed to cool, whereby the 3,6-diaminocarbazole precipitates therefrom and the precipitate is collected by filtration, whereafter the process of recrystallizing the 3,6-diaminocarbazole from boiling aniline containing boneblack is repeated. 32 gms. of 3,6-diaminocarbazole solids resulted.

The remaining steps are conducted in subdued light.

The 3,6-diaminocarbazole is tetrazotized by making a slurry of 32 gms. of 3,6-diaminocarbazole, 200 ml. HCl and 1,000 ml. water, which slurry is cooled to below 10° C. To the cooled slurry is added, with continuous cooling, over a period of 20 minutes a solution of 20.7 gms. sodium nitrite in 100 ml. water. The mixture is stirred for 25 additional minutes at a temperature below 10° C. and then filtered to give a solution of 3,6-carbazoletetrazonium chloride.

The solution of 3,6-carbazoletetrazonium chloride is warmed to room temperature, and 200 ml. of an aqueous solution containing 30 gms. sodium azide is added thereto with stirring. Stirring is contined for two hours and the 3,6-diazidocarbazole precipitate is collected by filtration, washed with water and dried over calcium chloride in vacuo.

What is claimed is:
1. 3,6-diazidocarbazole.
2. A method for making 3,6-diazidocarbazole comprising the steps of reducing 3,6-dinitrocarbazole to form 3,6-diaminocarbazole, tetrazotizing the 3,6-diaminocarbazole to form 3,6-carbazoletetrazonium chloride, and reacting the 3,6-carbazoletetrazonium chloride with sodium azide to form 3,6-diazidocarbazole.

References Cited by the Examiner
Morgan et al., "J. Chem. Soc.," vol. 121, pp. 2709–17 (1922).
Sawicki, "J.A.C.S.," vol. 77, pp. 957–60 (1960).

WALTER A. MODANCE, *Primary Examiner.*
ROBERT T. BOND, *Assistant Examiner.*